Figure 1:
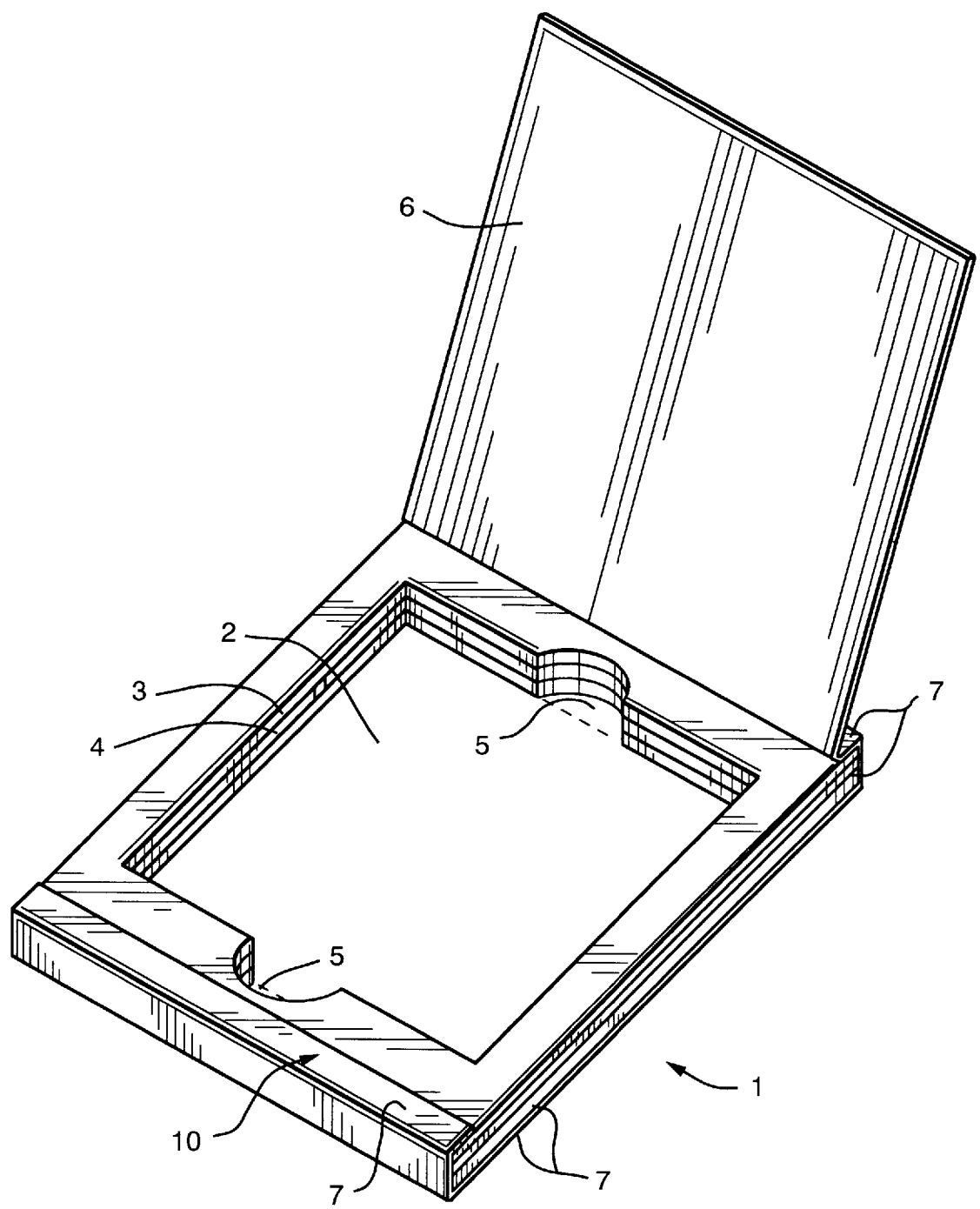

United States Patent [19]

Walch

[11] Patent Number: 5,772,018
[45] Date of Patent: Jun. 30, 1998

[54] PACKAGES FOR STORAGE MEDIA AND PROCESSES FOR PRODUCTION OF SAME

[76] Inventor: Herbert Walch, Pradler Strasse 49, A-6020 Innsbruck, Austria

[21] Appl. No.: 349,789

[22] Filed: Dec. 6, 1994

[30] Foreign Application Priority Data

Mar. 30, 1994 [DE] Germany ............................ 9405421 U
Sep. 13, 1994 [AT] Austria ................................. 1742/94
Sep. 13, 1994 [AT] Austria ................................. 1743/94

[51] Int. Cl.⁶ .................................................. B65D 85/57
[52] U.S. Cl. ................................ 206/308.1; 206/308.3; 493/84; 493/114
[58] Field of Search ........................... 493/84, 110, 114; 156/182, 196, 219, 220, 221, 224, 227; 206/308.1, 308.2, 308.3, 312, 311, 313

[56] References Cited

U.S. PATENT DOCUMENTS

| 4,709,812 | 12/1987 | Kosterka | 206/309 |
| 5,186,327 | 2/1993 | McCafferty et al. | 206/313 |
| 5,188,229 | 2/1993 | Bernstein | 206/312 |
| 5,460,265 | 10/1995 | Kiolbasa | 206/308.1 |
| 5,518,488 | 5/1996 | Schluger | 493/82 |

FOREIGN PATENT DOCUMENTS

| 0115746 | 8/1984 | European Pat. Off. . |
| 2333124 | 5/1975 | Germany . |
| 4134634 | 4/1993 | Germany ............................ 493/114 |
| 9307309 | 7/1993 | Germany . |
| 8702565 | 10/1987 | Netherlands ........................ 206/308.1 |

*Primary Examiner*—Jack W. Lavinder
*Attorney, Agent, or Firm*—Lorusso & Loud

[57] ABSTRACT

A process for the production of packagings for storage media, in particular optical storage disks or diskettes, comprising the following steps:

a) forming a bottom portion from one or more glued cardboard layers, b) forming a jacket portion from cardboard, c) forming a holding and receiving portion for the storage medium from cardboard, and d) glueing the portions formed in that way, wherein the holding and receiving portion is arranged over the bottom portion and the jacket portion covers at least a part of the lateral edges of the holding and receiving portion and/or the bottom portion, packagings of cardboard for storage media.

9 Claims, 20 Drawing Sheets

PACKAGES FOR STORAGE MEDIA AND PROCESSES FOR PRODUCTION OF SAME

The invention concerns a process for the production of packagings for storage media, in particular optical storage disks or diskettes.

The invention further concerns packagings, optical storage disks or diskettes, which can be produced in particular by a process according to the invention.

The term storage media is used herein in particular to denote optical storage disks (such as for example audio compact disks (CDs), CD-Is and CD-ROMs) as well as diskettes (such as for example 3½ inch diskettes) which are used in data processing installations.

Such storage media, in particular audio CDs, were hitherto packaged in plastic members which can only be recycled with difficulty and which thus do not represent an environmentally friendly packaging.

An object of the present invention is therefore that of providing a process with which environmentally friendly packagings can be produced in a simple fashion manually or by machine.

The invention also seeks to provide article features of environmentally friendly packagings.

The process according to the invention is characterized by the following steps:

a) forming a bottom portion from one or more glued cardboard layers, b) forming a jacket portion from cardboard, c) forming a holding and receiving portion for the storage medium from cardboard, and d) glueing the portions formed in that way, wherein the holding and receiving portion is arranged over the bottom portion and the jacket portion covers at least a part of the lateral edges of the holding and receiving portion and/or the bottom portion.

The use of cardboard makes it possible to avoid employing less environmentally friendly plastic material. Nonetheless packagings can be produced quickly and without difficulties, including by machine, by means of the process according to the invention. The packagings produced are distinguished by a stable and exact structure, a good protective action in relation to the storage media packaged therein, ease of handling and finally a visually attractive impression.

The jacket portion which is wrapped around the edges of the bottom portion and the holding and receiving portion covers over the lateral edges of the jacket portion and the bottom portion, which is of advantage in particular when using corrugated cardboard (corrugated card), on the one hand to prevent the ingress of dirt and moisture into the open passages of the corrugated card, on the other hand to increase the mechanical stability of the edge region of the corrugated card, and also to improve the visual impression. The use of corrugated card or corrugated cardboard has the advantage that, while being of greater thickness, it is low in weight and can be easily processed and worked and in particular can be easily folded after the corrugated card has been scored. In order to provide a straight fold, it is particularly advantageous for the scoring to be effected transversely to the corrugation configuration of the corrugated cardboard.

Using different kinds of bottom portions, jacket portions and holding and receiving portions, the process according to the invention, by virtue of assembly thereof in different ways, makes it possible to produce packagings which are ideally suited to the respective purpose of use, for example packagings for audio CDs with and without an additional enclosed booklet or other publication, for video CDs and CD-ROMs with and without an additional enclosed booklet or other publication, or for diskettes, in particular 3½ inch diskettes. Using a few main or basic components, it is thus possible to produce a very wide range of different packagings of one and the same packaging family, and in particular the various packagings may involve the same outside dimensions, advantageously those which are usual in relation to the plastic packagings of audio-CDs. A hollow space is advantageously provided for the additional enclosed booklet or the like, for accommodating same, in the usual format measuring 12 cm ×12 cm. The various packagings can in principle all be produced by the same or related process steps of a process according to the invention.

Further advantages and details of the invention are described in greater detail hereinafter with reference to the following specific description.

Figure 2:
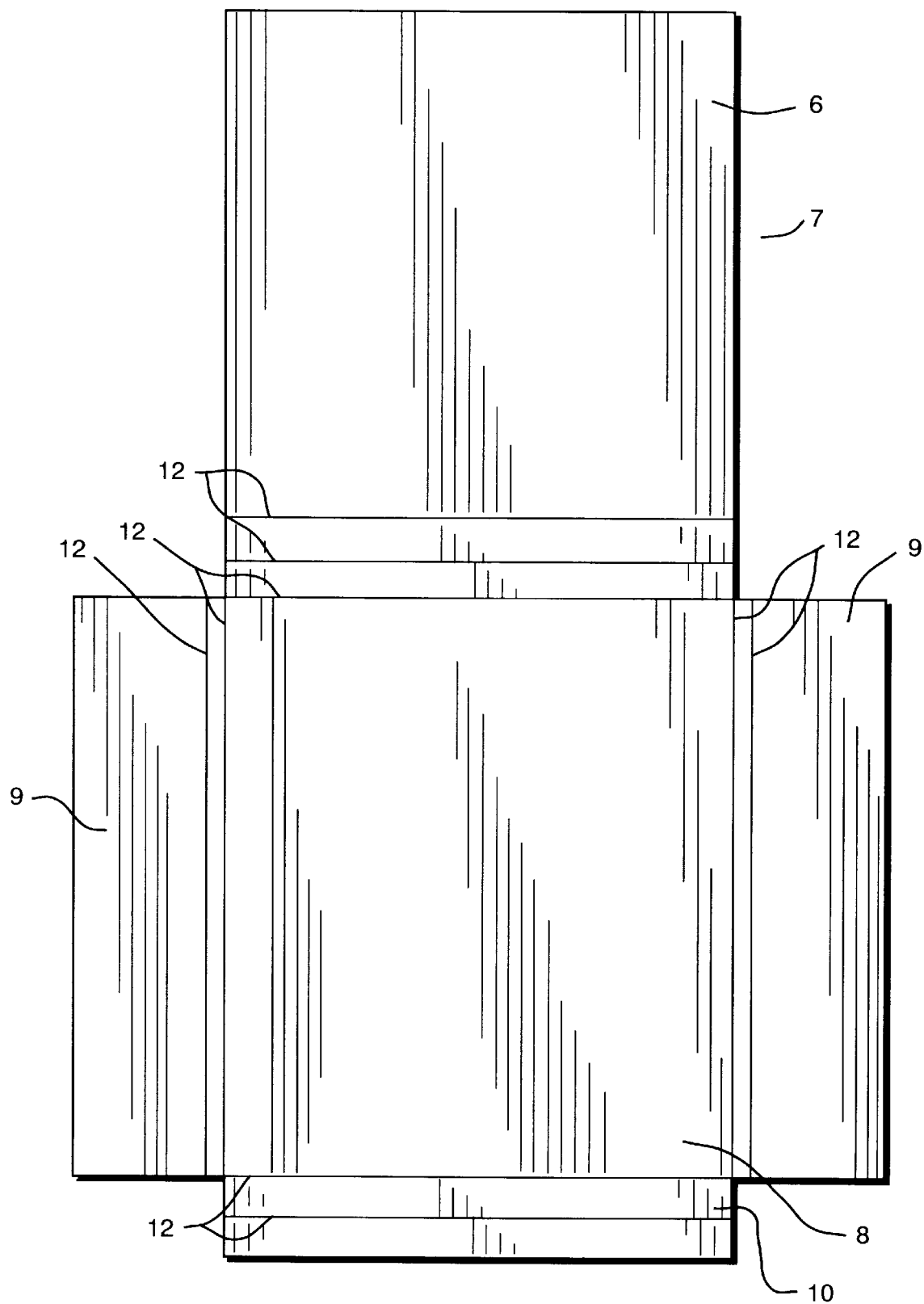
Figure 3:
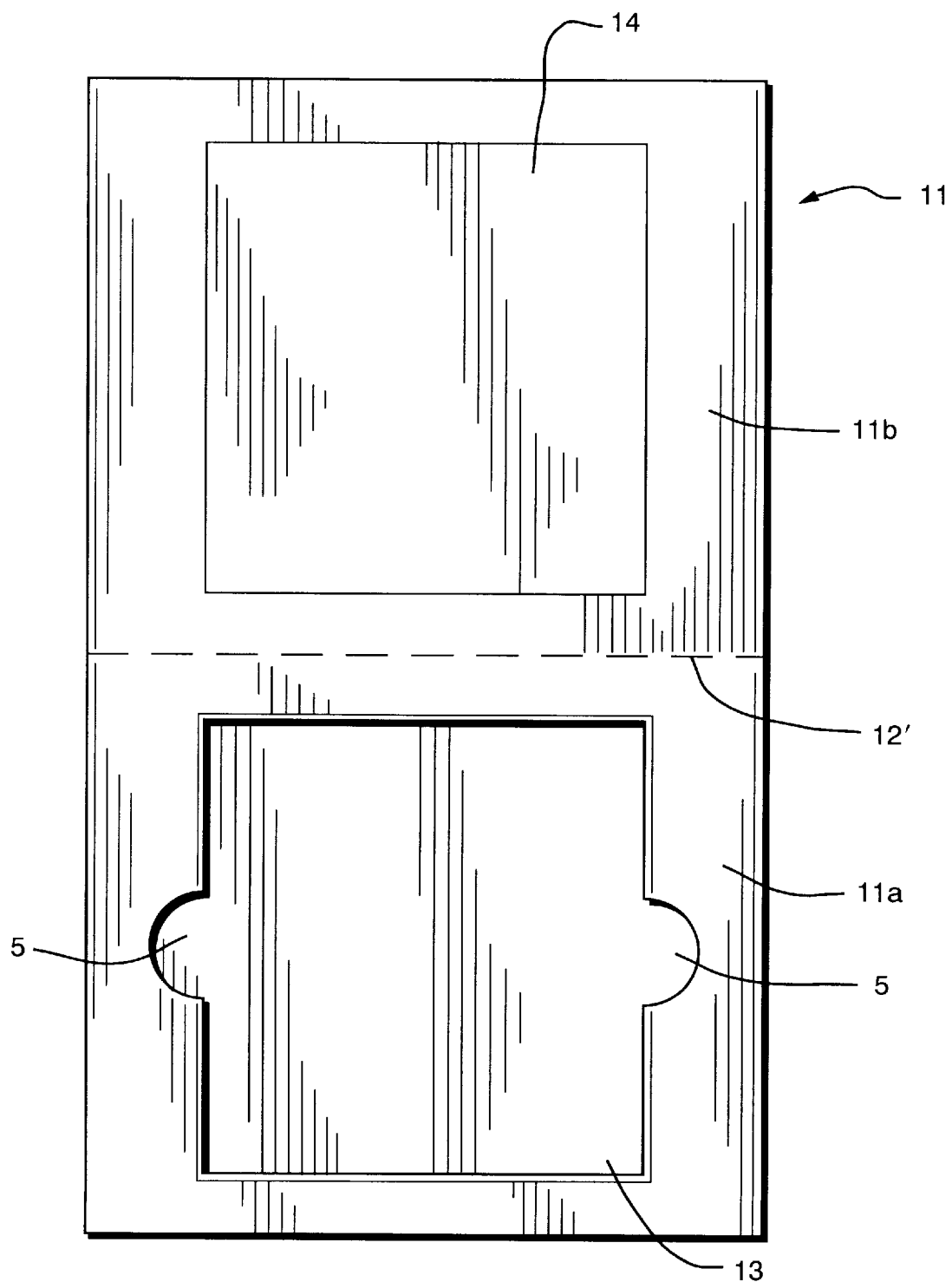
Figure 4:
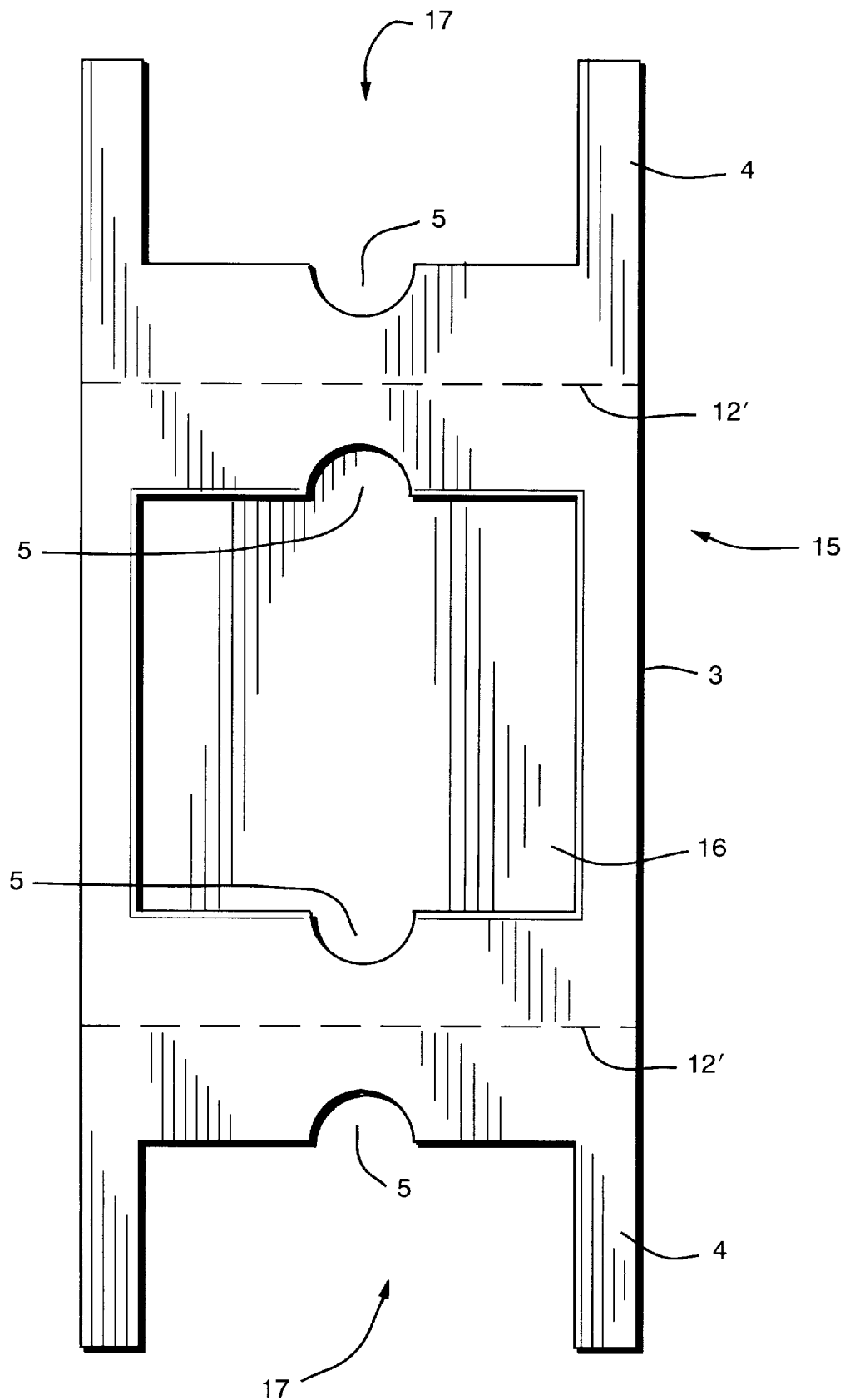
Figure 5:
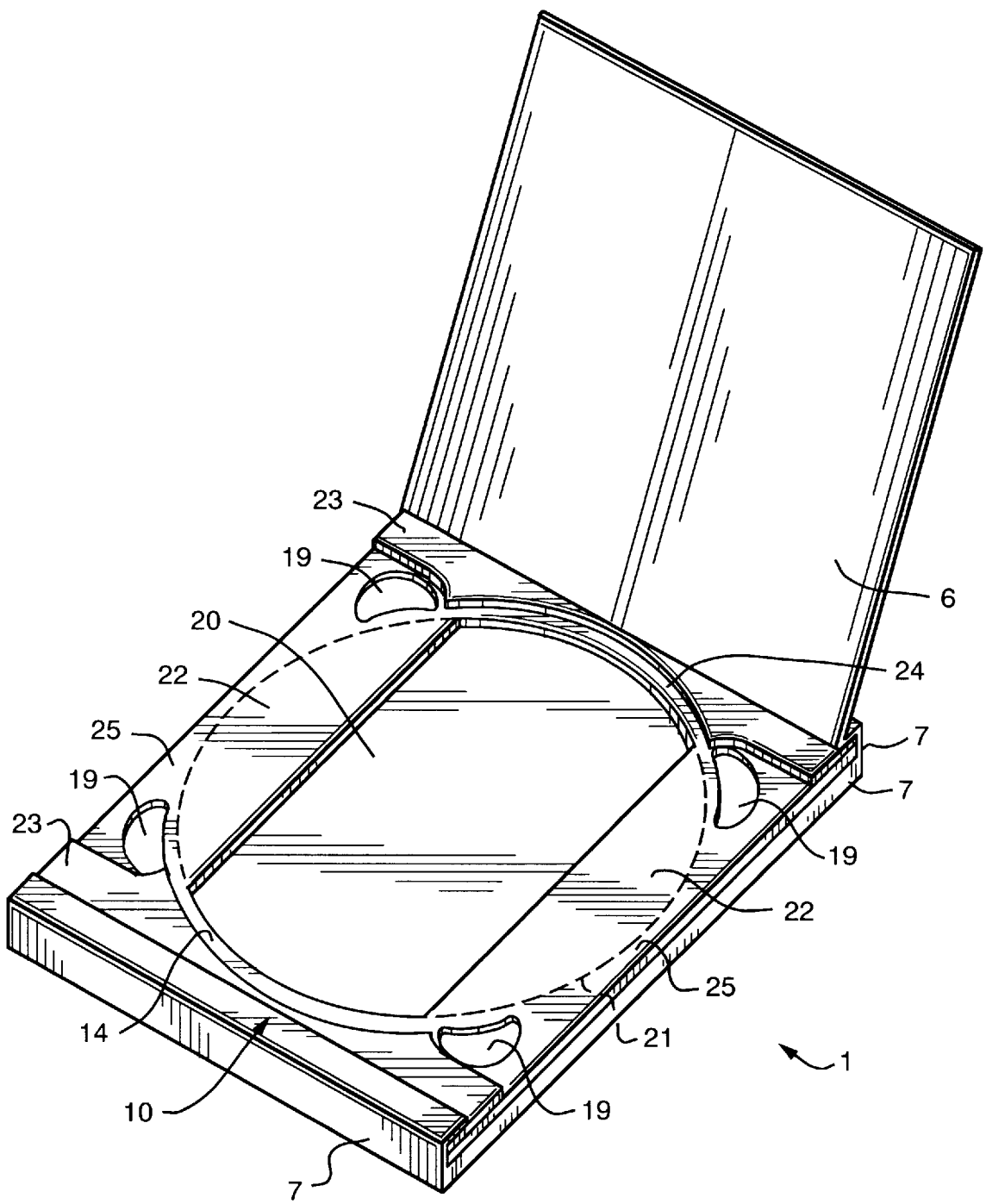
Figure 6:
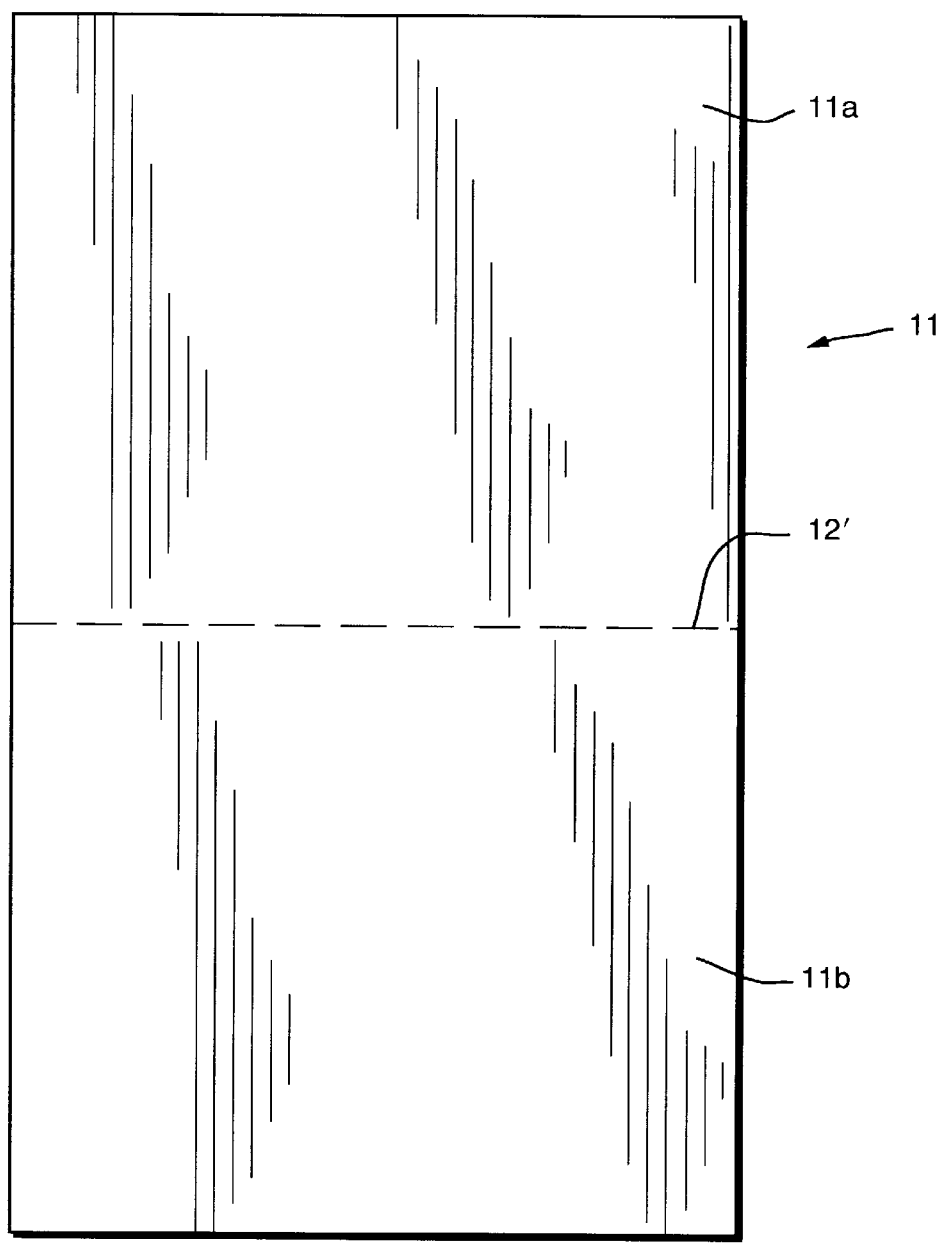
Figure 7:
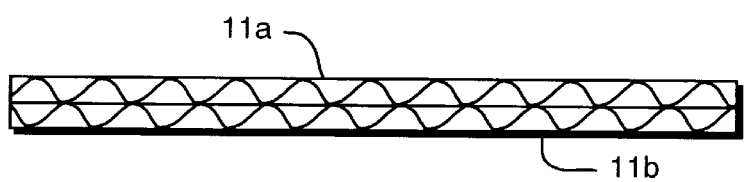
Figure 8:
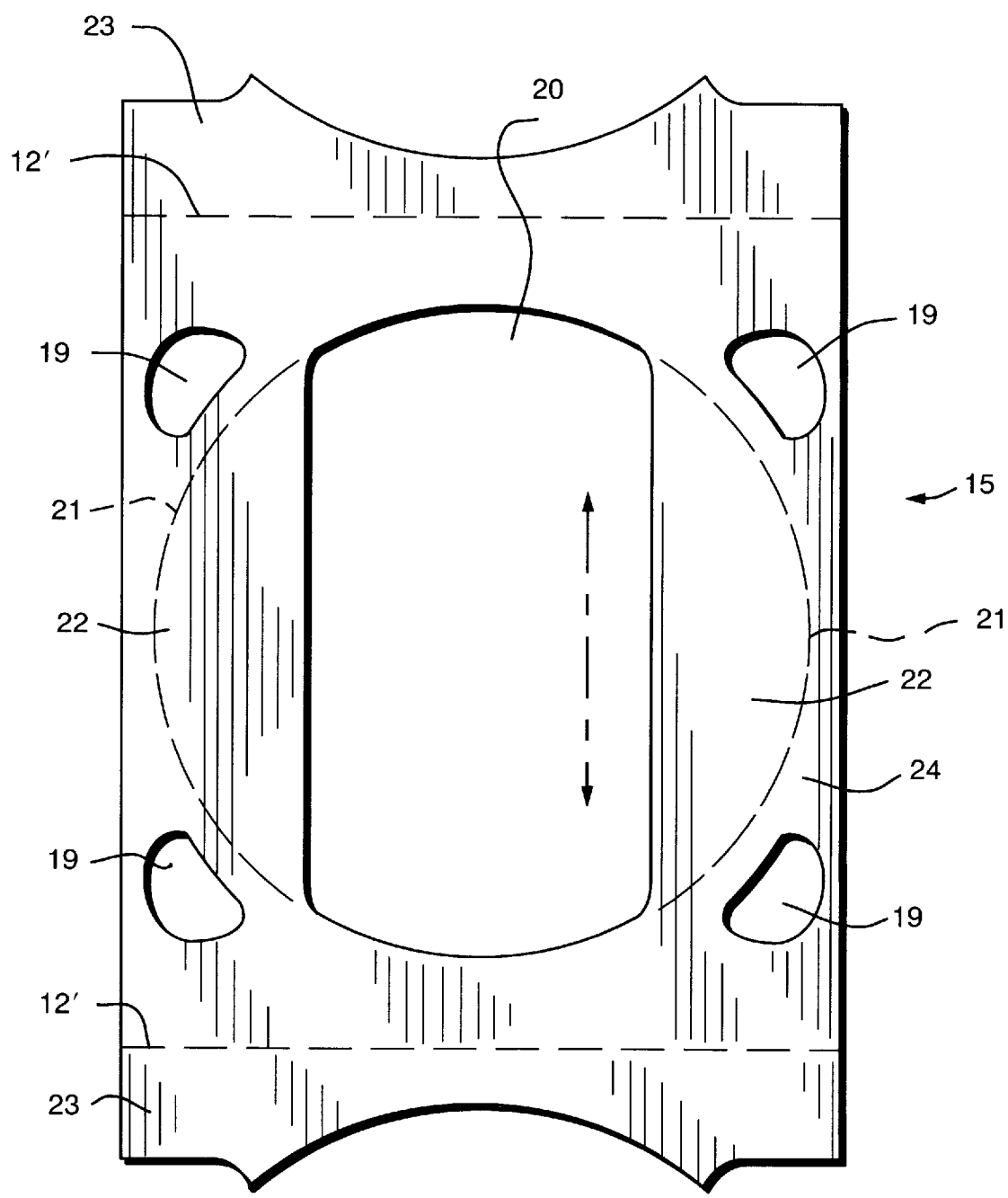
Figure 9:
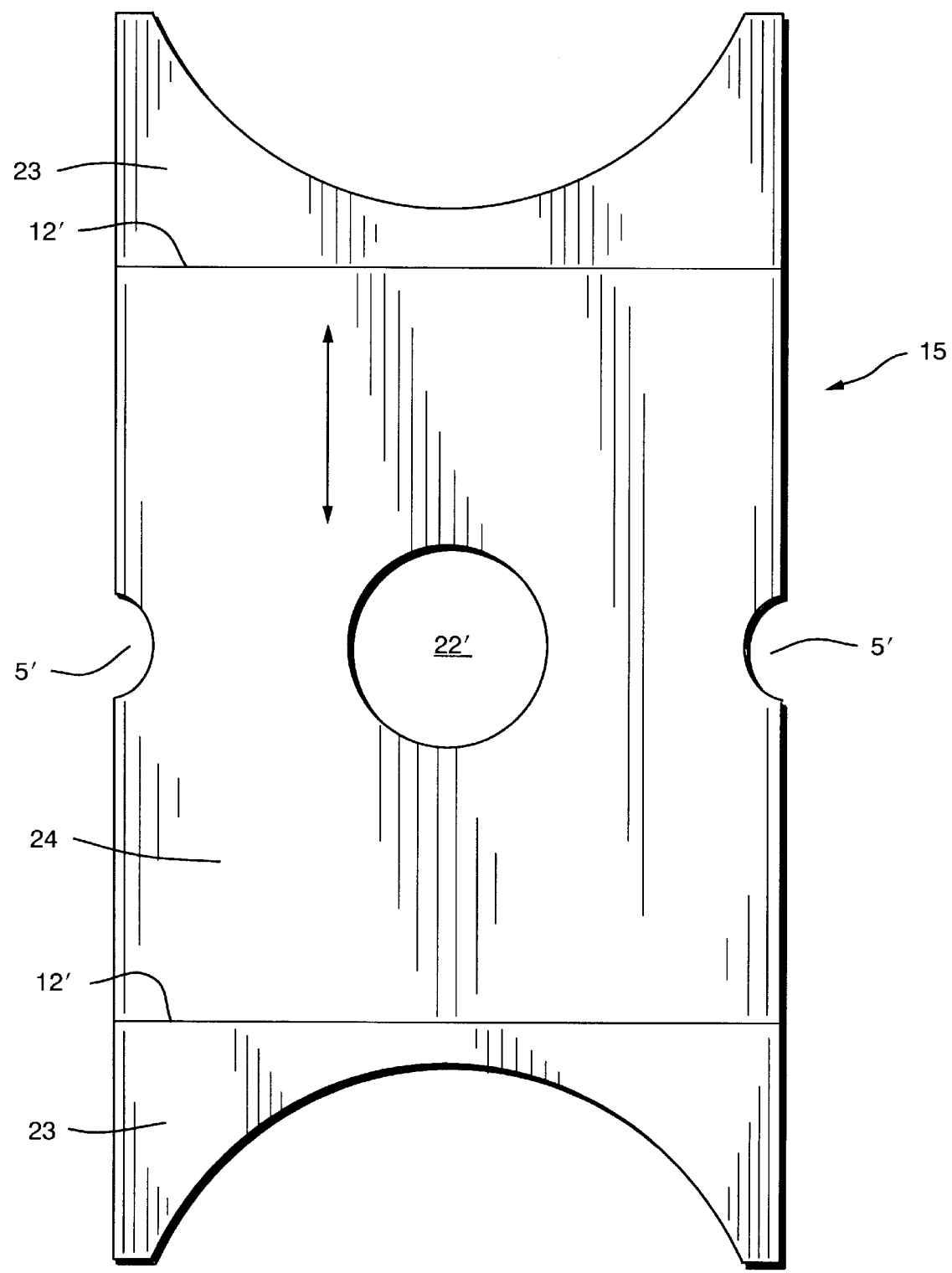
Figure 10:
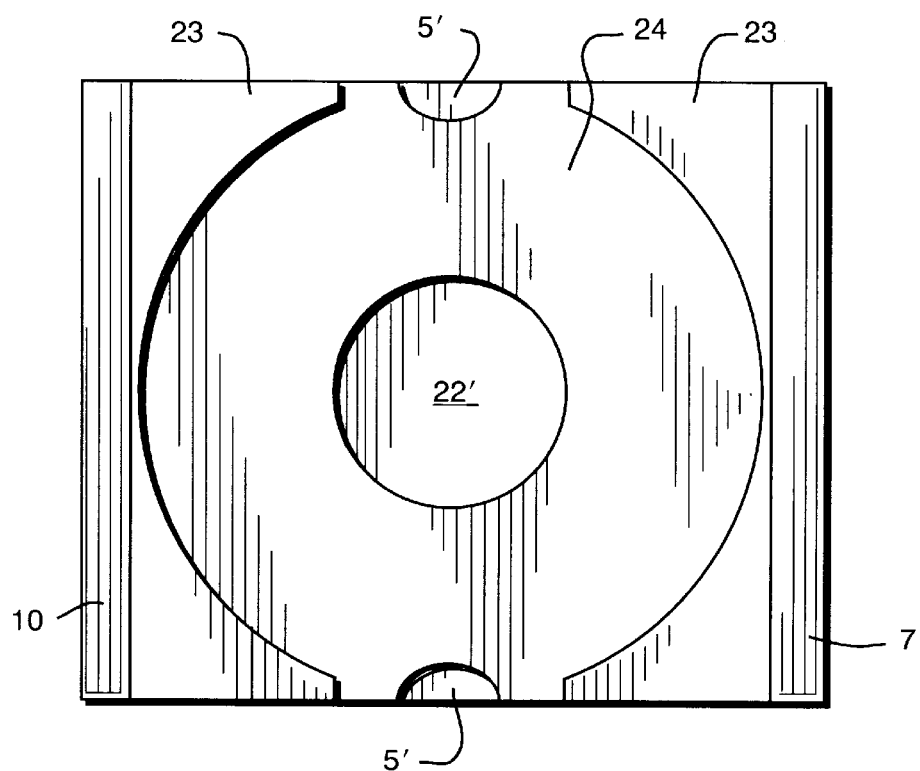
Figure 11:
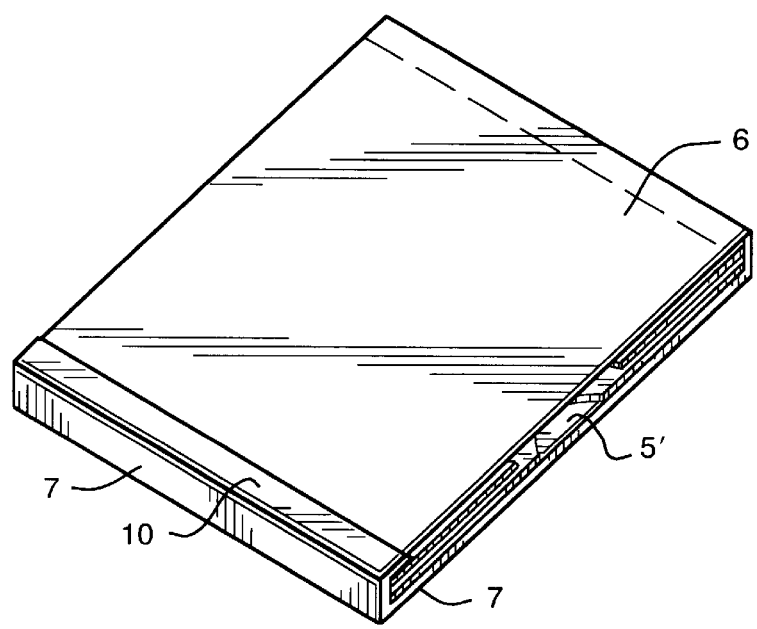
Figure 12:
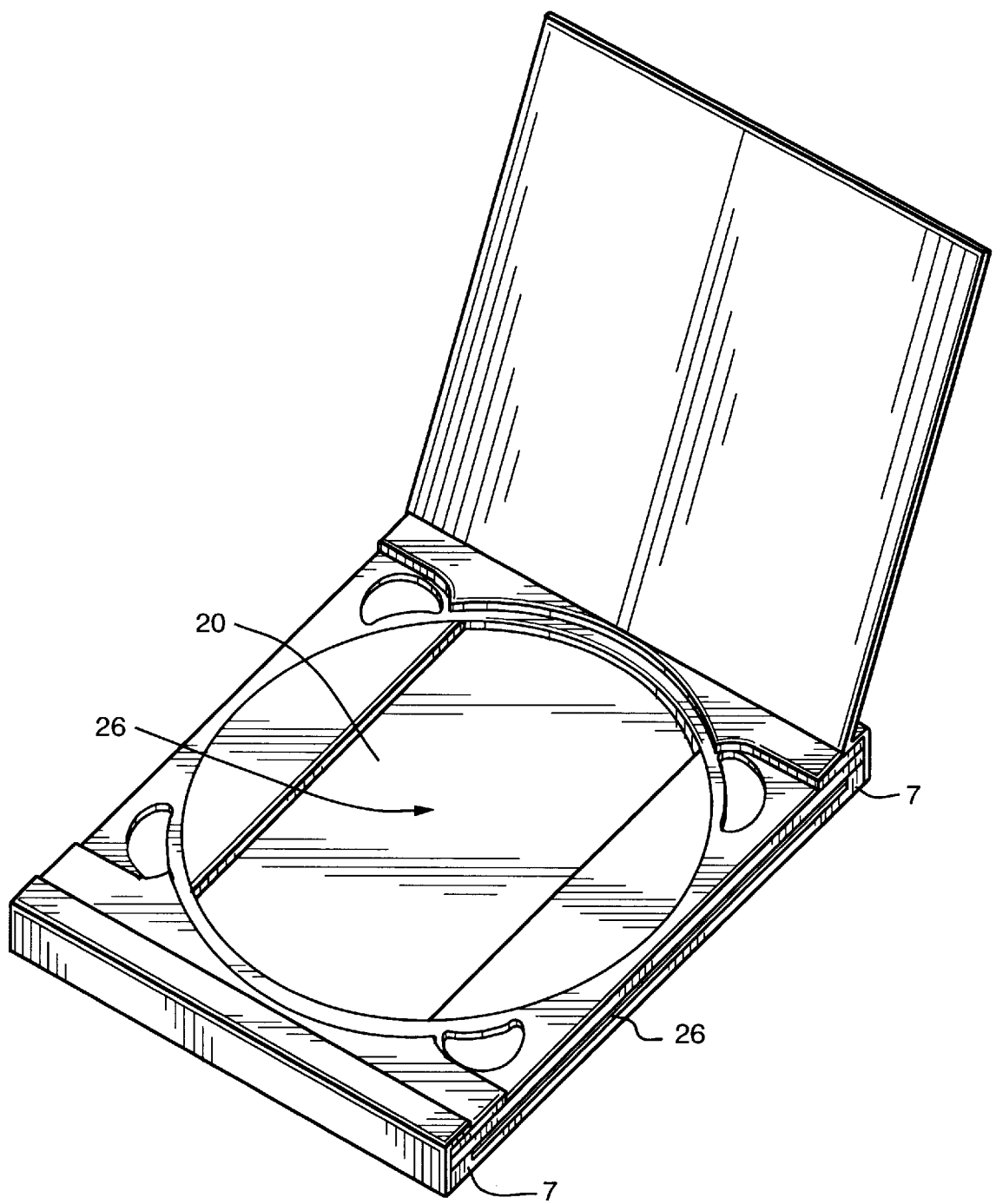
Figure 13:
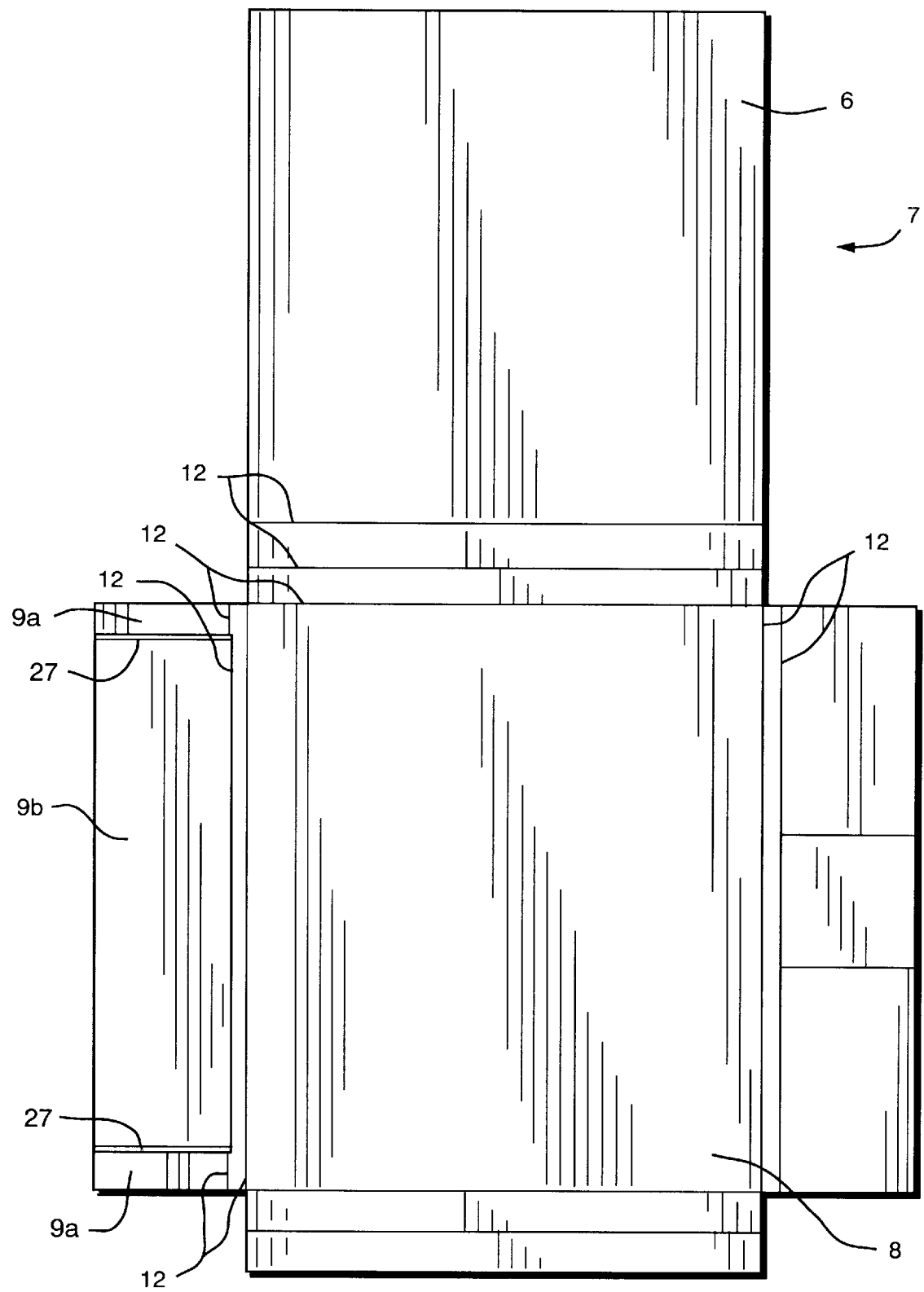
Figure 14:
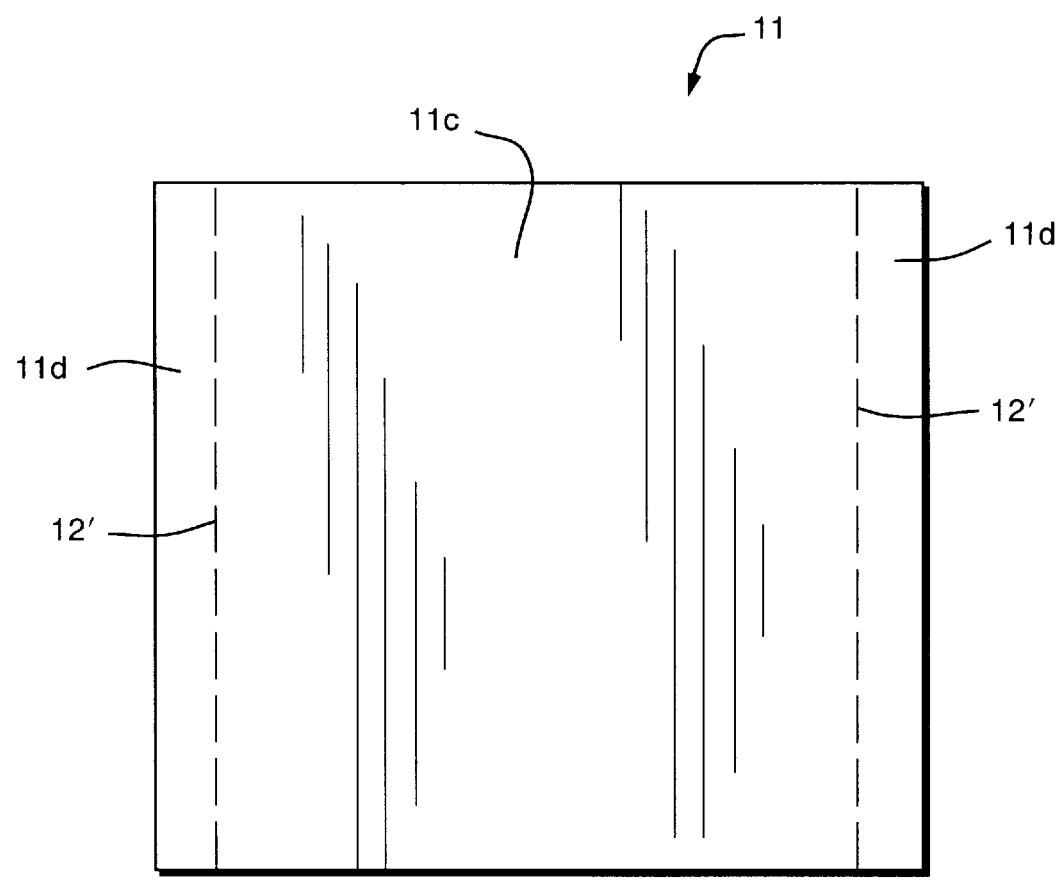
Figure 15:
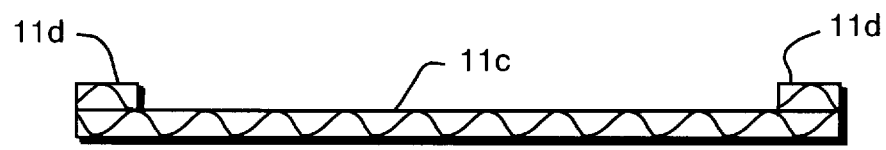
Figure 16:
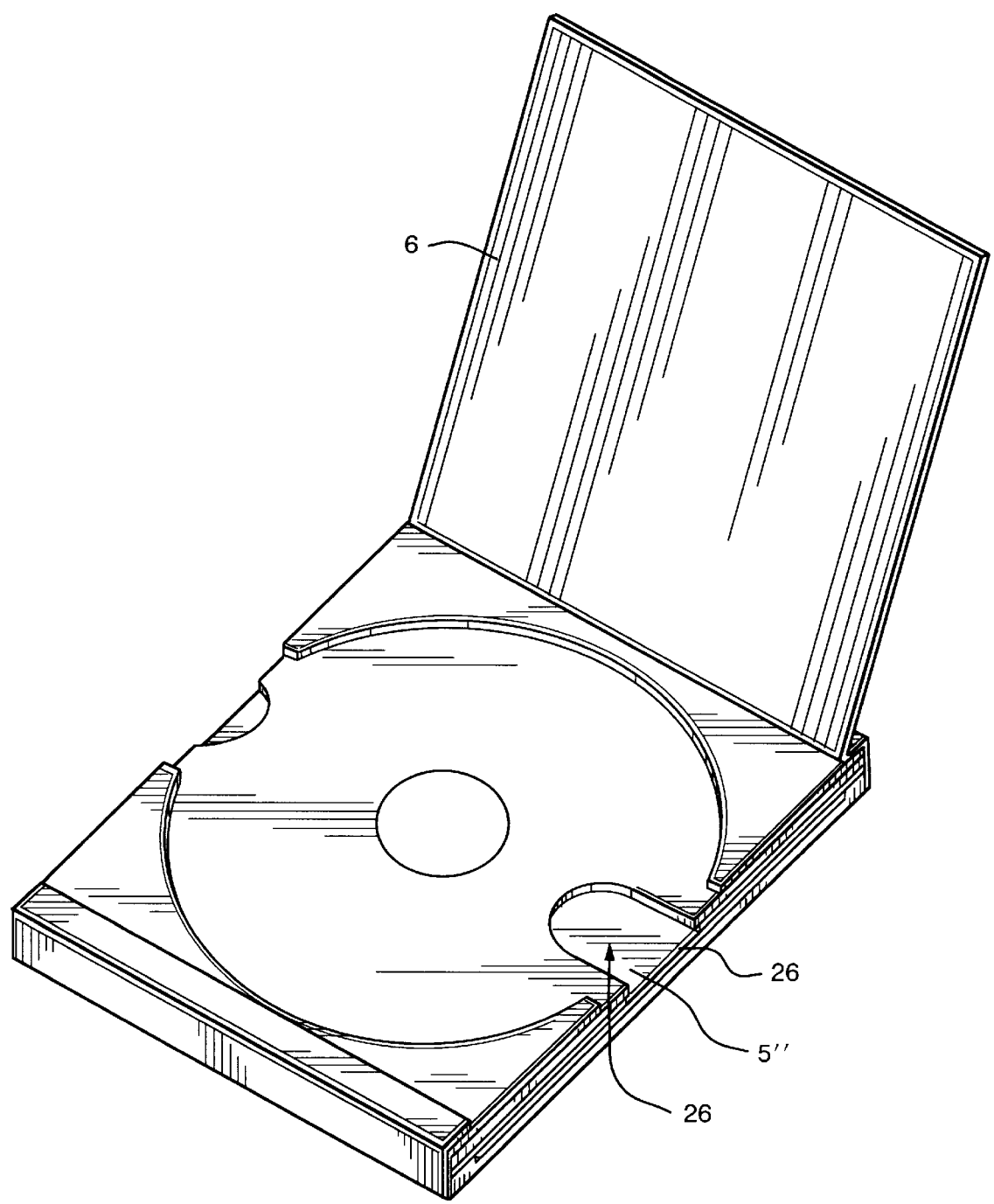
Figure 17:
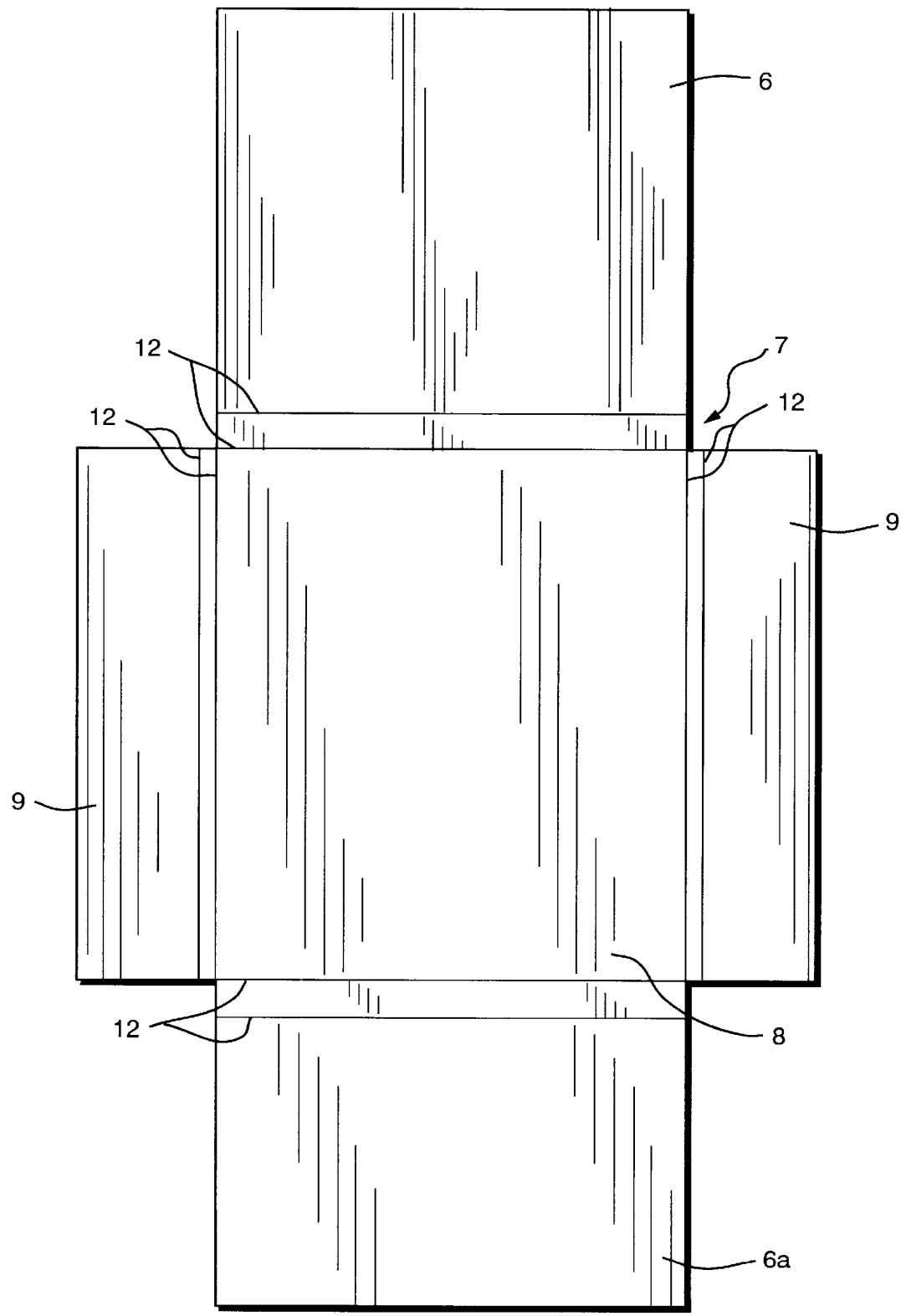
Figure 18:
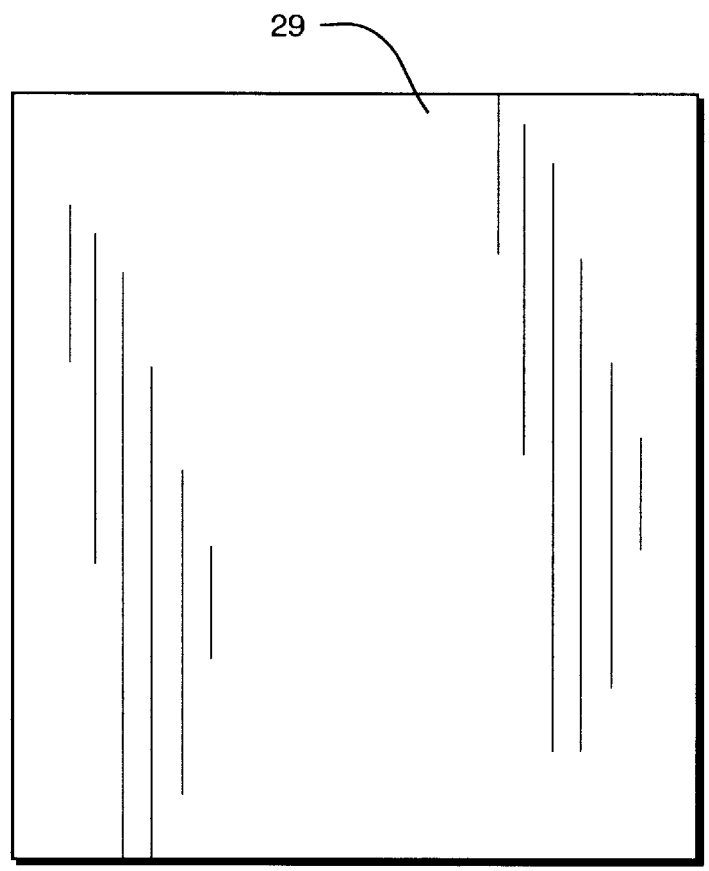
Figure 19:
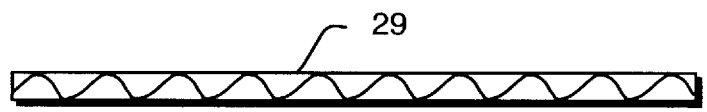
Figure 20:
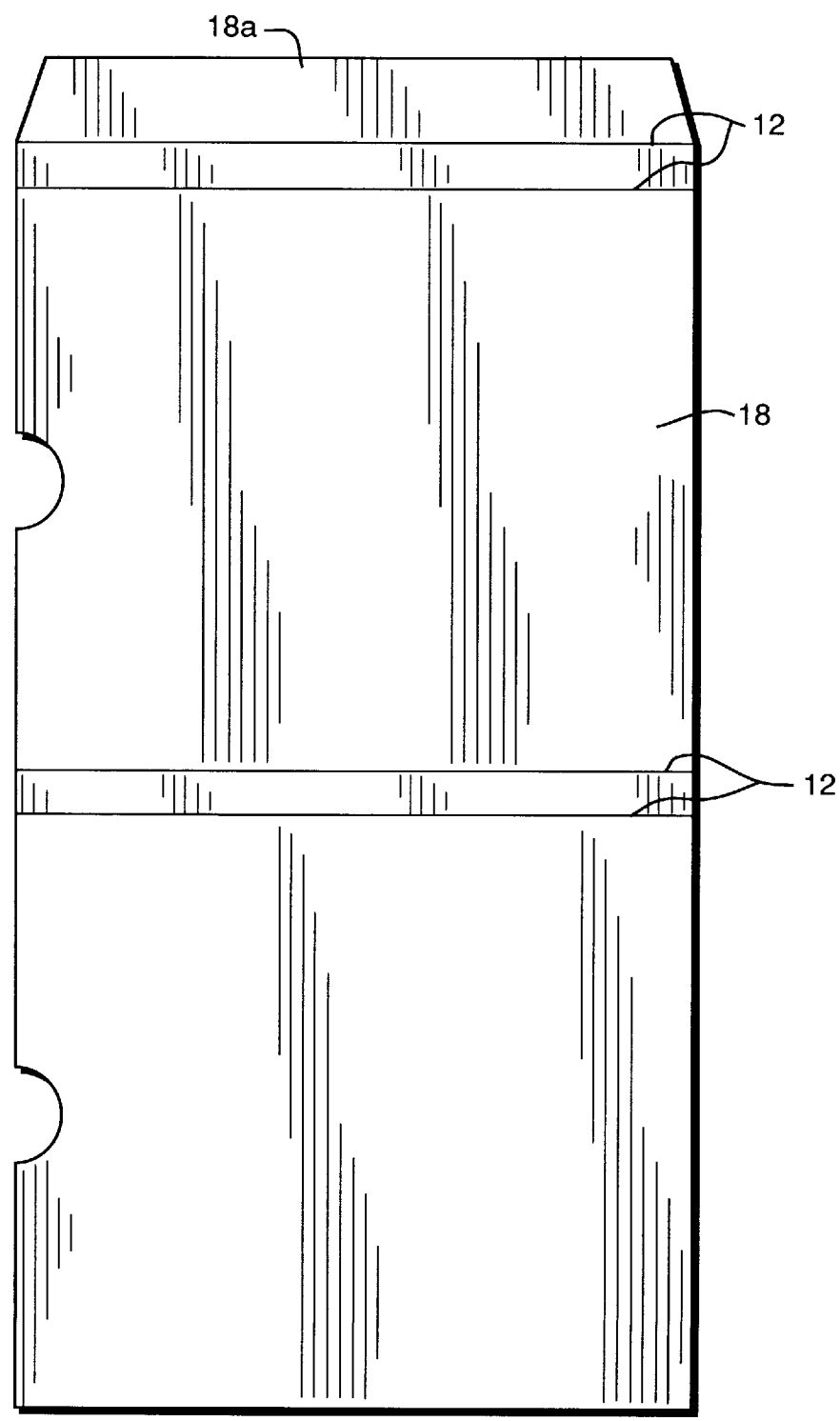
Figure 21A:
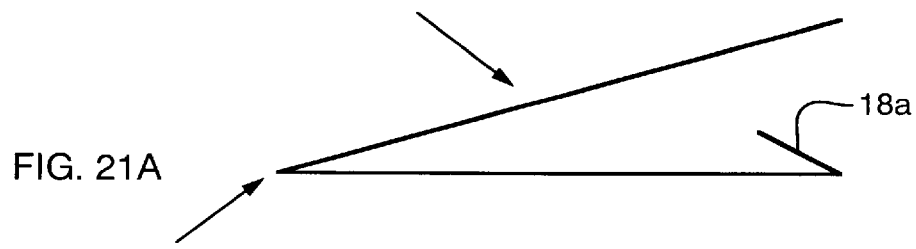
Figure 21B:
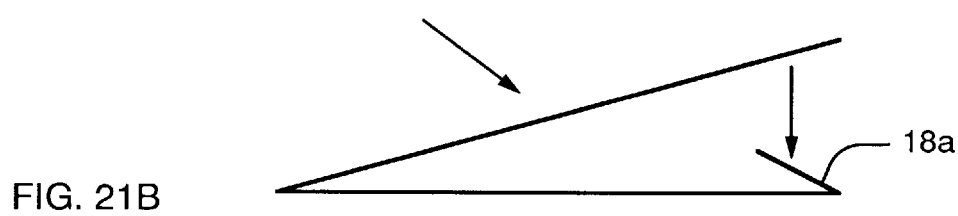
Figure 21C:
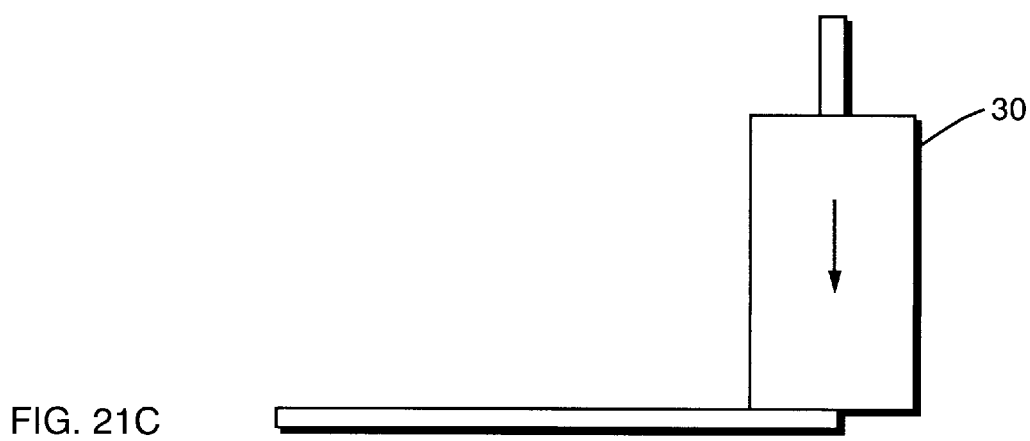
Figure 22:
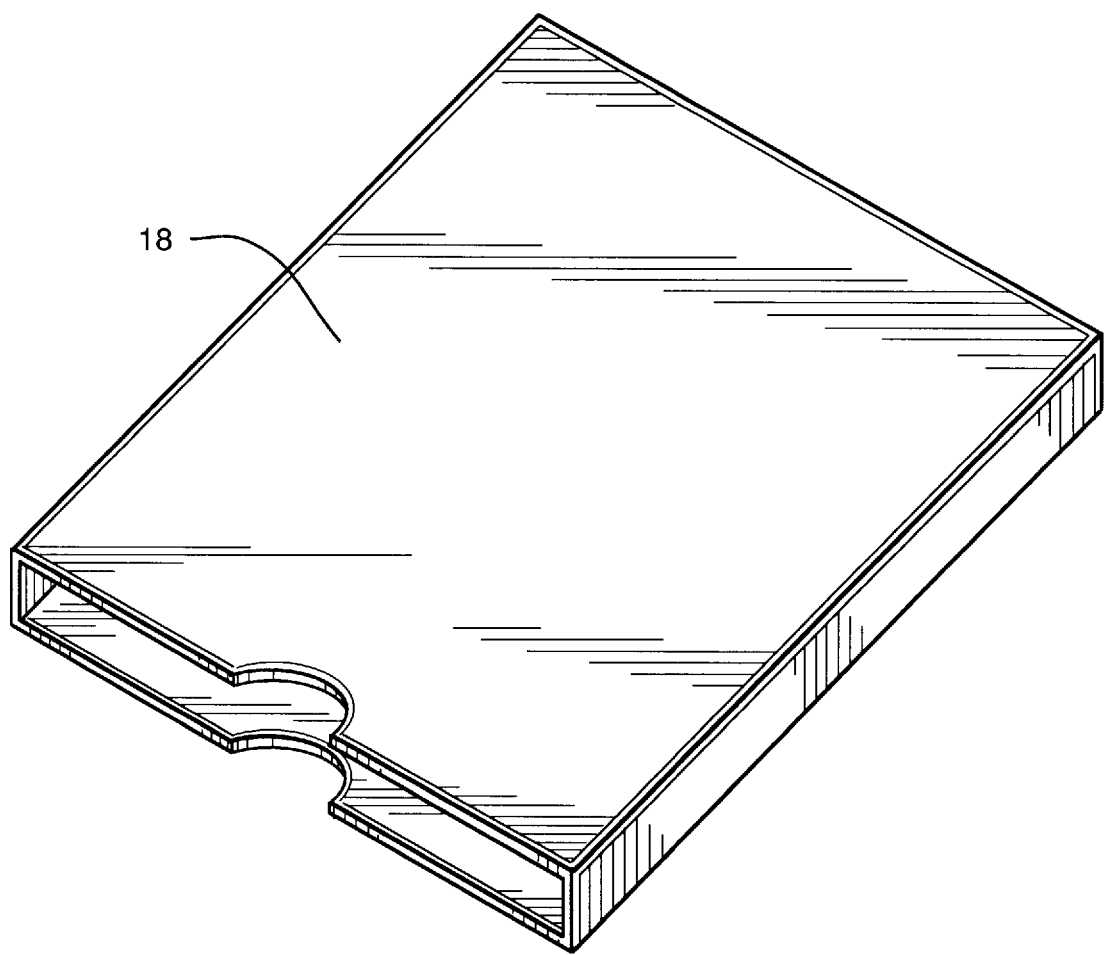
Figure 23:
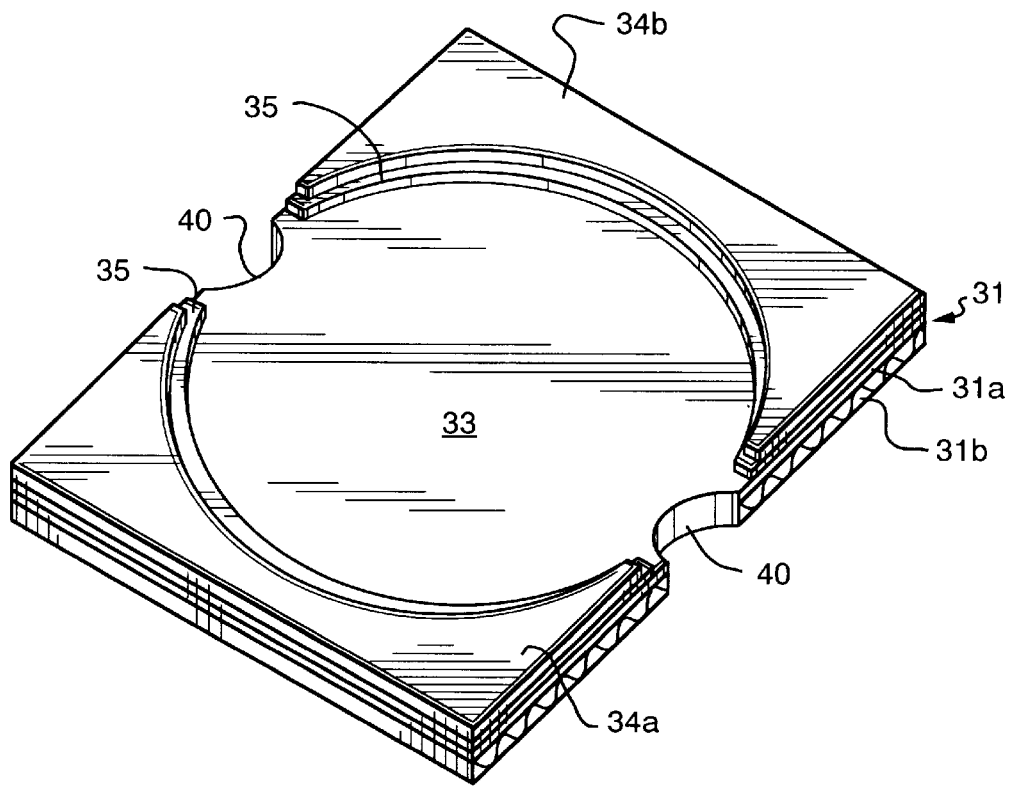
Figure 24:
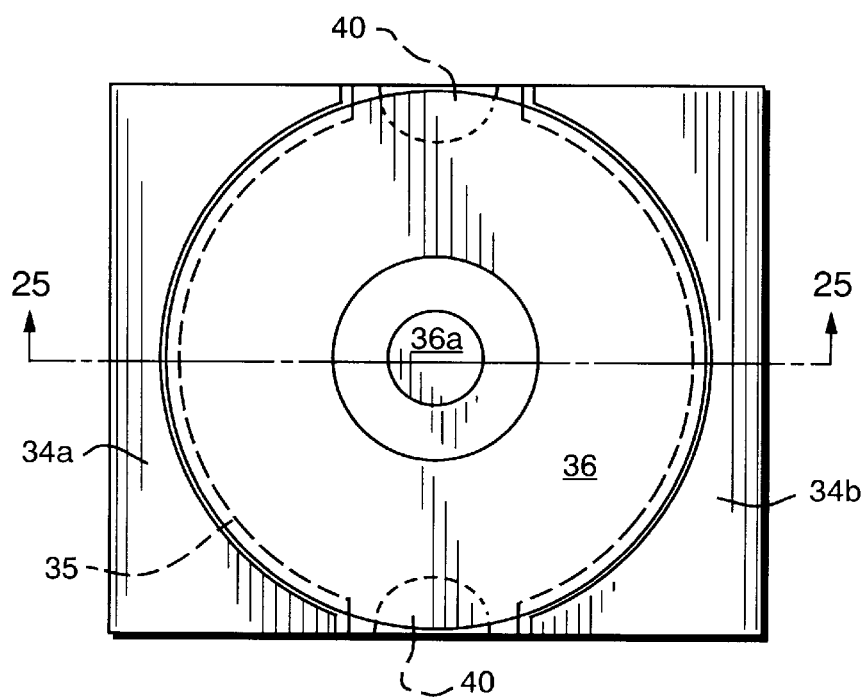
Figure 25:
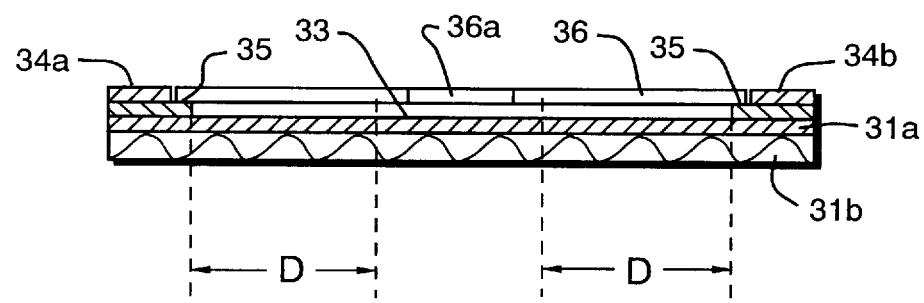
Figure 26:
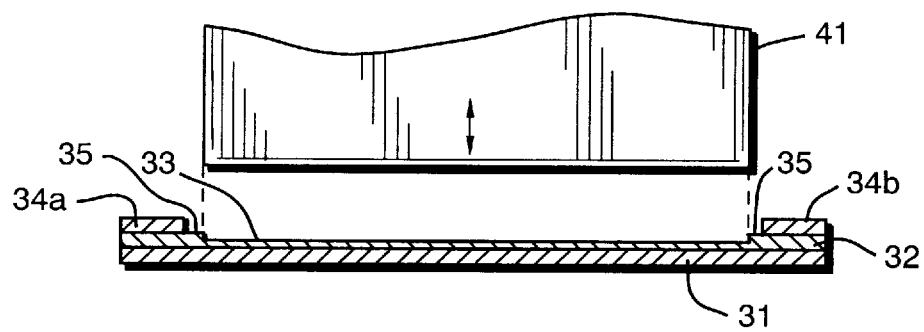

FIG. 1 shows a perspective view of an embodiment of a packaging according to the invention for two 3½ inch diskettes, FIG. 2 shows the blank for a jacket portion as is used in the packaging shown in FIG. 1, FIG. 3 shows the blank for a bottom portion for a packaging as shown in FIG. 1, FIG. 4 shows the blank for a holding and receiving portion for a packaging as shown in FIG. 1, FIG. 5 shows a perspective view of the carrier of a packaging for a video-CD or CD-ROM, FIG. 6 shows a plan view of the blank for the bottom portion for a packaging as shown in FIG. 5, FIG. 7 is a view in cross-section showing the bottom portion in FIG. 6, in the condition of being folded together, FIG. 8 shows the blank for a holding and receiving portion of a packaging as shown in FIG. 5, FIG. 9 shows a holding and receiving portion for the packaging for an audio-CD, as is shown in FIG. 11, FIG. 10 shows a plan view on to the carrier portion of said packaging (with the hinge or flap cover omitted), FIG. 11 shows a perspective view of the carrier portion of a packaging for an audio-CD with the flap cover closed, FIG. 12 shows a perspective view of a carrier of a packaging or a video-CD or CD-ROM with a space for an additional enclosed booklet, FIG. 13 shows the blank for the jacket portion for the carrier shown in FIG. 12, FIG. 14 shows the blank for the bottom portion of the carrier shown in FIG. 12, FIG. 15 shows a side view of the finished bottom portion, FIG. 16 shows a perspective view of the carrier of a packaging for an audio-CD with a space for an additional enclosed booklet, with the cover open, FIG. 17 shows the blank for the jacket portion of an alternative configuration for an audio-CD, FIGS. 18 and 19 show a plan view and a side view of the bottom portion, FIG. 20 shows the blank for a case into which a carrier as is shown in FIGS. 1, 5, 11, 12 or 16 can be inserted, FIGS. 21a through 21c show the procedure for the production of a case, FIG. 22 shows a perspective view of the finished case, FIG. 23 shows a carrier of an embodiment of a packaging according to the invention without inserted storage disk (CD), FIG. 24 shows a plan view of the carrier with inserted CD, FIG. 25 is a view in section taken along line A—A in FIG. 24, and FIG. 26 is a view in section showing the production of a further example.

The carrier 1 shown in FIG. 1 of a packaging according to the invention for diskettes comprises a plurality of glued layers of cardboard. In accordance with the invention, provided in the center is a recess or depression 2 into which, in the illustrated embodiment, two superposed 3½ inch diskettes can be inserted, with small lateral clearance.

The depression 2 is laterally delimited by the inside edges of the upper cardboard layers 3 and 4 which together form a holding and receiving portion for the inserted diskette.

A depression can be formed by way of two or more superposed layers 3, 4 with aligned openings, the depth of which depression is greater than the thickness of a layer of cardboard in order also to be able laterally to hold two or more diskettes in superposed relationship.

As FIG. 1 shows, in plan view the depression 2 is substantially rectangular, wherein at least one side of the rectangle has an outwardly facing recess 5 which is preferably semicircular in plan view. The recesses 5 permit the diskettes which are disposed in the depression 2 parallel to the layers or plies of cardboard 3 and 4 to be easily removed from the packaging.

The depression 2 can be covered over at the top by way of a pivotable hinge or flap cover 6 which is mounted on the carrier 1. After the cover 6 has been opened, the diskette or diskettes can be easily removed.

The carrier 1 shown in FIG. 1 essentially comprises three cardboard portions which are shown in FIGS. 2 through 4 and which are assembled in accordance with the process described hereinafter.

The outermost layer is a wrapping or jacket portion 7 of cardboard which involves the blank shown in FIG. 2. The jacket portion 7 has a portion 6 which later forms the cover and a bottom portion 8. Besides the flap which is free at one side and which forms the flap cover 6 for the depression 2, the jacket portion 7 also has three further flaps 9 and 10. The function of those flaps will be described in greater detail hereinafter.

The jacket portion is advantageously stamped out of a sheet of cardboard and grooved in the same working step, at the future fold locations 12. The stamping-out operation can be effected in two stages, wherein firstly cutting blades of the stamping tool cut the contour shown in FIG. 12 and then the jacket portion 7 is broken off by a co-operating stamping tool. Before the stamping-out or cutting-out operation the jacket portion can have printing applied thereto by an offset printing procedure. If a piece of cardboard with a structure is used, a screen printing process can also advantageously be employed.

As a further portion, the carrier 1 has a bottom portion 11 which is shown in FIG. 3. The bottom portion 11 comprises a rectangular piece of corrugated cardboard (corrugated card) which is scored along the line 12' in order to be folded together along that line. A substantially rectangular opening 13 with semicircular recesses 5 is stamped out in the portion 11a. A recessed region 14 is produced in the other portion 11b by embossing into the cardboard, by means of an embossing punch. The depth of the recessed region 14 together with the thickness of the portion 11a and the thickness of the two layers 3 and 4 then precisely affords the height of two 3½ inch diskettes, in the illustrated embodiment, so that the two diskettes lie flush with the surface of the carrier 1 under the cover 6.

As a further portion the carrier 1 has a holding portion which is generally identified by reference numeral 15 and which comprises fine corrugated card, as shown in FIG. 4.

An opening 16 with lateral recesses 5 is stamped out in the portion 15, in the middle section thereof. Laterally open openings 17 are stamped out in the two outer regions. The holding and receiving portion 15 has scorings 12' which extend transversely to the longitudinal direction of the corrugations of the corrugated cardboard and about which the two side parts 4 can be folded through 180° until they bear against the central part 3.

The portions shown in FIGS. 2 through 4 are assembled as follows:

After the bottom portion 11 shown in FIG. 3 has been folded together through 180° about the scoring line 12', it is glued on to the bottom section 8 of the jacket portion 7.

In that respect, it is possible for the jacket portion 7 to be arranged over a depression configuration which is somewhat larger than the outside dimensions of the bottom section 8 or the bottom portion 11. Thereupon, the bottom portion can be pressed from above on to the bottom section 8 of the jacket portion 7, in which case the latter moves into the depression configuration and the four flaps 6, 9 and 10 are automatically hinged perpendicularly upwardly at the edges of the depression configuration and are thus already in an ideal position for further processing.

The two lateral flaps 9 can now be folded in at the top about the locations which have been pre-scored along the lines 12, and thus cover over the lateral edges of the bottom portion 11.

The top side of the folded-over flaps 9 is now coated with adhesive and the holding portion 15, in the condition of being folded together, is stuck on. Finally the flap 10 is folded in both about the bottom portion 11 and also about the holding portion 15, at the top, and there glued fast in position. It thus completely covers over the edge, as is shown in FIG. 1. A similar procedure is effected on the other side. Here the flap with the cover 6 is also folded over upwardly and glued fast at the top.

The carrier can then pass through a pressing cover which is driven by electric motor, until all adhesives have hardened. Finally, with the cover in the hinged closed position, the carrier 1 can be inserted into a case as is shown in FIG. 22. That case 18 prevents opening of the cover 6 and thus additionally protects the diskettes disposed in the carrier.

In order to reduce the hardening time heat-activatable adhesives (hot melt adhesives) can be used. It has been found however that such adhesives give a less durable join. It is therefore particularly advantageous simultaneously to use two types of adhesive, namely a heat-activatable adhesive which is applied in punctiform manner and which holds immediately and a dispersion adhesive which is applied over an area and which ensures a durable join. That is particularly advantageous in the case of rapid production by machine. Both in manual production and also in production by machine, the portions (jacket portion 7, bottom portion 11 and holding and receiving portion 15) can be pre-fabricated in upstream-disposed process steps and then put into intermediate storage for example in stacks. A respective portion can then be removed from such stacks by hand or by machine and processed in the above-described manner by folding, bending over and glueing to provide a carrier for a storage medium. The individual steps in the procedure are comparatively simple in that respect and can therefore also be performed by machine.

While FIGS. 1 through 4 showed a carrier of a packaging for two 3½ inch diskettes, a carrier 1 for video-CDs or CD-ROMs with a sensitive data area is described with reference to FIGS. 5 through 8. In accordance with the invention the carrier 1 shown in FIG. 5 is also made up of a bottom portion 11 (FIGS. 6 and 7), a holding and receiving portion 15 (FIG. 8) and a jacket portion 7, in which respect the jacket portion 7 can be of exactly the same configuration as that shown in FIG. 2.

The production procedure is also the same as in the case of the embodiment described with reference to FIGS. 1 through 4. Firstly the individual portions 7, 11 and 15 are formed. The portion 7 has already been described. In the case of the portion 11 shown in FIG. 6, a rectangle is stamped out of a piece of corrugated cardboard, and scored along the line 12', and then the two parts 11a, 11b are folded over to produce a stable bottom portion as is shown in a side view in FIG. 7.

The holding and receiving portion 15 shown as a blank in FIG. 8 is stamped out of a piece of fine micro-corrugated cardboard and grooved along the lines 12'. In the stamping-out operation, the openings 19 and the large central opening 20 are also stamped out. In the stamping-out operation or in a subsequent working step, an embossing punch can be used to impress in the cardboard a circular region 22 which lies within the lines 21, that is to say, a region which is depressed relative to the rest of the surface can be produced in that way.

Prior to assembly of the portion 15 shown in FIG. 8, the two lateral flaps 23 are folded over on to the central portion 24 and possibly glued fast.

Assembly to provide the carrier shown in FIG. 5 is then again effected by applying the bottom portion 11 on to the jacket portion 7, by then folding in and glueing fast the flaps 9 and then glueing fast the holding and receiving portion 15 in FIG. 8, whereupon finally the flap 10 and the flap of the jacket portion 7, which has the flap 6, is glued fast on the top side of the holding and receiving portion 15 (more precisely on the flaps 23 thereof).

Accordingly, between the parts 23, there is a depression which is set down relative to the surface of the parts 23 and into which can be fitted an optical storage disk, in particular a video-CD or CD-ROM. In that case the arcuate sections of the flaps 23 hold the CD centered in the carrier 1. The CD lies only with its outermost edge on the central part 24 of the holding and receiving portion 15. In the interposed region there is the opening 20 and, within the line 21, the region 22 which is depressed by embossing. The material can be easily displaced through the large opening 20 in the embossing operation.

The openings 19 form finger recesses for removing the CD. They are advantageously not disposed at the edge of the carrier 1, thus affording laterally continuous web portions 25 which give a high degree of stability and which do not bend even in the embossing operation.

All in all, with the packaging shown in FIG. 5, it is possible to pack a CD without the sensitive data area thereof bearing directly against cardboard. For that reason only the outside diameter of the recessed region 22 has to be larger than the region of the optical storage disk, which is provided with data.

If, instead of the holding and receiving portion 15 shown in FIG. 8, the packaging uses the receiving portion 15 shown in FIG. 9, then, with a bottom portion as shown in FIGS. 6 and 7 and a jacket portion as shown in FIG. 2, that gives a carrier which is suitable in particular for packaging an audio-CD. That carrier is shown in FIGS. 10 and 11. It has a flat support 24 for the CD. A central circular region 22' is set back because audio-CDs usually have a projecting ridge at the underside. The depression 22' provides that, in spite of the above-mentioned ridge, the CD lies snugly on the surface 24 and can be held in a centered position by the lateral raised portions 23. Recesses 5' which are open towards the side are provided for removal of the CD.

The packaging shown in FIG. 12 differs from that shown in FIG. 5 essentially in that in the bottom portion it has a laterally open space or cavity 26 in which an additional enclosed booklet can be inserted. The space 26 is also accessible from above by way of the large central opening 20 so that a booklet which has been completely pushed into the space 26 can also be pushed outwardly. In order to form the space, the bottom portion, as shown in FIGS. 14 and 15, besides a central section 12c, has two narrow outer sections lid which can be hinged up along scorings 12' in order to form a bottom portion as shown in FIG. 15. There is now space for an additional booklet, above the portion 11c, between the two narrow portions 11d. Apart from the bottom portion 11, the jacket portion 7, starting from FIG. 2, must also be slightly altered, as is shown in FIG. 13. The alteration essentially involves the provision of incisions 27 in the left-hand projecting flap, the incisions 27 permitting the flap portion 9b to be folded in on to the bottom portion 11c and the two lateral flap portions 9a to be folded in on to the bottom portions 11d which are at a higher level, so that an opening to the cavity 26 remains at the side.

In the production of such a packaging, it is desirable for an insert to be fitted in the meantime into the place used for the space 26 or the additional booklet, in order to prevent the space 26 from being compressed in the glueing and pressing operations. The insert is afterwards removed again from the glued packaging.

As shown in FIG. 16, a laterally accessible space 26 may also be provided in a packaging for an audio-CD, as is essentially shown in FIGS. 10 and 11. The jacket portion can correspond to that shown in FIG. 13, the bottom portion can correspond to that shown in FIG. 14 and the holding and receiving portion can essentially correspond to that shown in FIG. 9, although in this case the right-hand finger hole 5' is increased in size to form an elongate slot 5" in order to make it easier to remove a booklet which has been inserted into the space 26.

A holding and receiving portion as shown in FIG. 9 can be used in the embodiment shown in FIG. 17. The bottom simply comprises a rectangular plate 29, as is shown in FIGS. 18 and 19. Besides the cover 6, the jacket portion, as shown in FIG. 17, has a second cover 6a. Upon assembly the part 29 is laid on to the central region 8 and then the parts 9 are folded in and glued fast. Thereupon a holding and receiving portion as shown in FIG. 9 can be glued on and then the covers 6 and 6a are folded up.

FIG. 20 shows the blank for a case 18 which can also be stamped out of cardboard. The case 18 has grooves 12 at the later fold locations and also has an adhesive strip portion 18a. To form a closed case which is open at two sides, as is shown in FIG. 22, the adhesive strip portion 18a is folded in, coated with glue and then loaded by a weight 30, as is shown in FIGS. 21a through 21c.

The carrier shown in FIG. 23 of a packaging has a main body 31 of corrugated card 31a and an intermediate layer 31b with a flat surface. Stuck on to that surface are two pieces of cardboard which provide the supports 35 for the CD. Glued on to those pieces of cardboard are two raised portions 34a and 34b in the form of further pieces of cardboard, the thickness of which corresponds to the thickness of the CD. The surface, which is free between the raised portions 34a and 34b, of the pieces of cardboard therebeneath forms the stepped support 35 for the CD. The surface 33 of the intermediate layer 31b is recessed relative to the support 35 (see FIGS. 23 and 25) so that the CD is only supported outside the data region D.

The raised portions 34a and 34b are adapted in terms of their shape to the peripheral edge of the storage disk (CD)

and for that purpose have contact parts which are in the form of a circular arc in plan view. The radius of the arc of those contact pieces is preferably slightly larger than or substantially equal to the radius of the storage disk 36 to be inserted. In that way there may be a small clearance between the raised portions 34a and 34b which act as centering means and the storage disk 36 which is inserted into the packaging (see FIG. 24). That makes it easier for the CD to be inserted and removed as, in contrast to the hitherto conventional central crown receiving means, the CD is no longer clamped fast in position by a locking force. Due to the support surface 35 being formed from cardboard the CD can also be supported in a secured position with the underside thereof, which in itself is sensitive, without the risk of damage to the data region D. Provided in the carrier 31 in plan view are two oppositely disposed recesses or indentations 40. As shown in 25 FIG. 24, they extend inwardly to a position beneath the storage disk 36 so that the edge of the storage disk 36 can be more easily gripped by two fingers and thus the storage disk 36 can be easily lifted off the carrier 31.

The two pieces of cardboard with the supports 35 and then the two pieces of cardboard 34a and 34b are glued on to the rectangular main body 31. As the outside edge thereof coincides at three sides with the main body, the portions which are glued on can be easily aligned on the main body 31 so as to ensure rapid mechanical manufacture. The intermediate layer 31b can even be omitted if the top side of the layer 31a is suitably made from corrugated card. The corrugated card 31a makes it possible to achieve a high level of stiffness, while involving low weight. The portions 31b, 34a and 34b can also be made from corrugated card (of smaller thickness). If necessary the open sides of the corrugated card can be covered by a cover means (not shown).

After the CD 36 has been fitted on to the support surface 33 in position between the raised portions 34a and 34b, as shown in FIG. 24 or FIG. 25, that unit can be fitted into a case or box of cardboard. An embodiment of a case made from cardboard is shown in FIG. 22.

FIG. 26 shows the production of a further, particularly simple embodiment which can be exactly manufactured. A continuous layer of cardboard 32 is glued on a main carrier 31. The raised portions 34a, 34b, preferably also of cardboard, are glued on the cardboard layer 32. In order to provide a support 35 which supports the storage disk only outside its data region D, the cardboard layer 32 is simply provided by means of a punch or stamp 41 with a circular recess in its central region so that a depressed surface 33 is present in the central region and remains present after the cylindrical punch or stamp has been removed again. The amount by which the recessed surface 33 is recessed relative to the stepped support 35 needs to be only slight. All that is involved in fact is that the data region D of the storage disk 36 does not lie directly against the cardboard of the packaging.

All components of the packaging according to the invention can also be produced from recycled cardboard made from waste paper or waste cardboard, so that environmental pollution is overall still further reduced.

I claim:

1. A process for the production of packagings for storage media, in particular optical storage disks or diskettes, characterized by the following steps:
 a) forming a bottom portion having lateral edges from one or more glued cardboard layers by stamping out a piece of cardboard and scoring said bottom portion along a line, wherein sections to the left and to the right of the line are of equal size and the two sections are folded together to provide a two-layer bottom portion,
 b) forming a separate jacket portion from cardboard,
 c) forming a separate holding and receiving portion having lateral edges for a storage medium from cardboard, and
 d) gluing the bottom portion, jacket portion and holding and receiving portion such that the holding and receiving portion is arranged over the bottom portion and the jacket portion covers at least part of the lateral edges of the holding and receiving portion or the bottom portion.

2. A process for the production of packagings for storage media, in particular optical storage disks or diskettes, characterized by the following steps:
 a) forming a bottom portion having lateral edges from one or more glued cardboard layers, wherein a depressed region is embossed into the bottom portion,
 b) forming a separate jacket portion from cardboard,
 c) forming a separate holding and receiving portion having lateral edges for a storage medium from cardboard, and
 d) gluing the bottom portion, jacket portion and holding and receiving portion such that the holding and receiving portion is arranged over the bottom portion and the jacket portion covers at least part of the lateral edges of the holding and receiving portion or the bottom portion.

3. A process for the production of packagings for storage media, in particular optical storage disks or diskettes, characterized by the following steps:
 a) forming a bottom portion having lateral edges from one or more glued cardboard layers,
 b) forming a separate jacket portion from cardboard,
 c) forming a separate holding and receiving portion having lateral edges for a storage medium from cardboard, and
 d) gluing the bottom portion, jacket portion and holding and receiving portion such that the holding and receiving portion is arranged over the bottom portion and the jacket portion covers at least part of the lateral edges of the holding and receiving portion or the bottom portion, wherein the jacket portion is used with a bottom section which corresponds in its dimensions to the bottom portion, wherein projecting from the bottom section are four flaps which, preferably after fold grooves have been impressed, are folded upwardly and glued.

4. The process as set forth in claim 3 wherein the bottom portion is applied to the bottom section of the jacket portion, whereupon two oppositely disposed ones of the four flaps of the jacket portion are bent upwardly and glued on the top side of the bottom portion, and thereupon the holding and receiving portion is glued on to the top side of the bottom portion or strip portions which are glued there, whereupon finally two other strip portions of the jacket portion are folded upwardly and glued on the holding and receiving portion.

5. The process as set forth in claim 3 wherein the jacket portion is arranged over a depression configuration which is somewhat larger than the outside dimensions of the bottom section, and wherein the bottom portion is pressed from above on to the bottom section, while the bottom section moves into the depression configuration to automatically fold the four flaps upwardly at the edge of the depression configuration.

6. A process for the production of packagings for storage media, in particular optical storage disks or diskettes, characterized by the following steps:
 a) forming a bottom portion having lateral edges from one or more glued cardboard layers, b) forming a separate jacket portion from cardboard, c) forming from cardboard, a separate holding and receiving portion having lateral edges for a storage medium and having a central part and two lateral flaps wherein the two lateral flaps, after an operation of impressing folding grooves or scorings, are folded over upwardly on to the central part in order to hold in centered relationship a storage medium which is supported in the central region of the central part, d) gluing the bottom portion, jacket portion and holding and receiving portion such that the holding and receiving portion is arranged over the bottom portion and the jacket portion covers at least part of the lateral edges of the holding and receiving portion or the bottom portion.

7. A process for the production of packagings for storage media, in particular optical storage disks or diskettes, characterized by the following steps:

a) forming a bottom portion having lateral edges from one or more glued cardboard layers, b) forming a separate jacket portion from cardboard, c) forming from cardboard, a separate holding and receiving portion having lateral edges for a storage medium, wherein a depressed region is embossed on a top side of the holding and receiving portion, and d) gluing the bottom portion, jacket portion and holding and receiving portion such that the holding and receiving portion is arranged over the bottom portion and the jacket portion covers at least part of the lateral edges of the holding and receiving portion or the bottom portion.

8. A process for the production of packagings for storage media, in particular optical storage disks or diskettes, characterized by the following steps:

a) forming a bottom portion having lateral edges from one or more glued cardboard layers, b) forming a separate jacket portion from cardboard, c) forming a separate holding and receiving portion having lateral edges for a storage medium from cardboard, and d) gluing the bottom portion, jacket portion and holding and receiving portion such that the holding and receiving portion is arranged over the bottom portion and the jacket portion covers at least part of the lateral edges of the holding and receiving portion or the bottom portion, wherein a dispersion adhesive which is applied over an area and a heat-activatable adhesive (hot melt) which is applied in punctiform manner are simultaneously used for the gluing operation.

9. A cardboard packaging for storage media wherein a carrier for a storage medium comprises a bottom portion of one or more layers of cardboard, a separate holding portion which is disposed above the bottom portion and which is provided with a depression and which also has one or more layers of cardboard, and a separate jacket portion which extends under the bottom portion and which from there is folded over upwardly around edges of the bottom portion and at least partially of the holding portion and glued; wherein the jacket portion is folded over at two oppositely disposed sides of the carrier over the bottom portion and the holding portion disposed thereabove, and glued to the holding portion.

* * * * *